United States Patent
Reznic et al.

(10) Patent No.: US 7,860,180 B2
(45) Date of Patent: Dec. 28, 2010

(54) OFDM MODEM FOR TRANSMISSION OF CONTINUOUS COMPLEX NUMBERS

(75) Inventors: Zvi Reznic, Tel Aviv (IL); Nathan Elnathan, Ra'anana (IL); Meir Feder, Herzliya (IL); Shay Freundlich, Givat Ada (IL)

(73) Assignee: Amimon Ltd, Herzlia (IL)

( * ) Notice: Subject to any disclaimer, the term of this patent is extended or adjusted under 35 U.S.C. 154(b) by 1104 days.

(21) Appl. No.: 11/551,654

(22) Filed: Oct. 20, 2006

(65) Prior Publication Data
US 2007/0115797 A1     May 24, 2007

Related U.S. Application Data

(60) Provisional application No. 60/729,459, filed on Oct. 21, 2005, provisional application No. 60/752,155, filed on Dec. 19, 2005, provisional application No. 60/758,060, filed on Jan. 10, 2006.

(51) Int. Cl.
*H04L 5/12* (2006.01)
*H04L 23/02* (2006.01)

(52) U.S. Cl. ........ 375/261; 375/260; 375/279; 375/298; 375/308; 455/39; 455/73; 348/471; 348/489; 348/728

(58) Field of Classification Search ........ 375/260, 375/261, 279, 298, 308, 324, 329, 320, 340; 455/39, 73; 328/441, 471, 488, 489, 723, 328/724, 725, 728
See application file for complete search history.

(56) References Cited

U.S. PATENT DOCUMENTS

| 5,768,535 | A | 6/1998 | Chaddha et al. |
| 6,788,349 | B2 | 9/2004 | Wu et al. |
| 2003/0002582 | A1 | 1/2003 | Obrador |
| 2004/0196404 | A1 | 10/2004 | Loheit et al. |
| 2004/0196920 | A1 | 10/2004 | Loheit et al. |

FOREIGN PATENT DOCUMENTS

| EP | 06 83 6492 | | 9/2009 |
| WO | WO 2005/029737 | * | 3/2005 |
| WO | WO 2005/029737 A | | 3/2005 |
| WO | WO 2005/055444 A | | 6/2005 |

OTHER PUBLICATIONS

Yujin Noh et al, Design of Unequal Error Protection for MIMO-OFDM Systems, Vehicular Technology Conference, May 30, 2005, pp. 1058-1062, vol. 2, IEEE, Piscataway, NJ, USA.

Fazel K et al, A Concept of Digital Terrestrial Television Broadcasting, Wireless Personal Communications, Jan. 1, 1995, pp. 9-27, vol. 2 No. 1/02, Springer, Dordrecht, NL.

Skoglund, M., et al. Design and Performance of VQ-Based Hybrid Digital-Analog Joint Source-Channel Codes. IEEE Transactions on Information Theory. vol. 48. No. 3. Mar. 2002.

Mittal, U., et al. Hybrid Digital-Analog (HDA) Joint Source-Channel Codes for Boradcasting and Robust Communications, IEEE Transactions on Information Theory. vol. 48. No. 5 May 2002.

Mittal, U. Broadcasting, Robustness and Duality in a Joint Source-Channel Coding System. New York State University. Aug. 1999.

Schreiber, W. Advanced Television Systems for Terrestrial Broadcasting: Some Problems and Some Proposed Solutions. Proceedings of the IEEE. vol. 83. No. 6. Jun. 1995.

Ramstad, T. The Marraige of Subband Coding and OFDM Transmission.

* cited by examiner

*Primary Examiner*—Phuong Phu
(74) *Attorney, Agent, or Firm*—Eitan Mehulal Law Group (57) ABSTRACT

The invention enables the transmission of continuous complex numbers using a symbol based transmission scheme such as OFDM. Accordingly, complex numbers are mapped to the constellation map, enabling a fine granularity of constellation points. This scheme may be used, for example, in the transmission of video where the coefficients representing the higher frequency of each of the video components, as well as the quantization error values of the DC and near DC components, or some, possibly non-linear transformation thereof, are sent as pairs of real and imaginary portions of a complex number that comprises a symbol.

33 Claims, 4 Drawing Sheets

| | # of DCT coefficients | Typ. # of Tx coefficients |
|---|---|---|
| Y | 64 | 45-64 |
| Cr | 64 | 12-64 |
| Cb | 64 | 12-64 |

OFDM MODEM FOR TRANSMISSION OF CONTINUOUS COMPLEX NUMBERS

This application claims priority to the following commonly assigned provisional application entitled: "Apparatus and Method for Uncompressed, Wireless Transmission of Video" Ser. No. 60/729,459, filed Oct. 21, 2005, which is incorporated herein in its entirety by this reference thereto. This application also claims priority to U.S. provisional patent application Ser. No. 60/752,155, filed Dec. 19, 2005, entitled "An Apparatus and Method for Unequal Error Protection of Wireless Video Transmission", and to U.S. provisional patent application Ser. No. 60/758,060, filed Jan. 10, 2006, entitled "Use of Pilot Symbols for Data Transmission in Uncompressed, Wireless Transmission of Video", both assigned to common assignee and which are hereby incorporated herein in their entirety by this reference thereto.

BACKGROUND OF THE INVENTION

1. Field of the Invention

The invention relates to the transmission of uncompressed video over a wireless link. More specifically, the invention relates to the delay-less and buffer-less transmission of uncompressed HDTV video over a wireless link using direct mapping of image transform coefficients to transmission symbols.

2. Discussion of the Prior Art

In many houses, television and/or video signals are received through cable or satellite links at a set-top box at a fixed point in the house. In many cases, it is desired to place a screen at a point a distance from the set-top box by a few meters. This trend is becoming more common as flat-screen using plasma or liquid crystal display (LCD) televisions are hung on a wall. Connection of the screen to the set-top box through cables is generally undesired for aesthetic reasons and/or installation convenience. Thus, wireless transmission of the video signals from the set-top box to the screen is preferred. Similarly, it may be desired to place a computer, game controller, VCR, DVD, or other video source that generates images to be displayed on a screen a distance from the screen.

Generally, the data are received at the set-top box compressed in accordance, for example, with the motion picture expert group (MPEG) format and are decompressed by the set-top box to a high quality raw video signal. The raw video signal may be in an analog format or a digital format, such as the digital video interface (DVI) format or the high definition multimedia interface (HDMI) format. These digital formats generally have a high definition television (HDTV) data rate of up to about 1.5 Giga bits per second (Gbps).

Wireless short range transmission in the home can be done over the unlicensed bands around 2.4 GHz or around 5 GHz (e.g., in the U.S. 5.15-5.85 GHz band). These bands are currently used by wireless local area networks (WLAN) where the 802.11 WiFi standard allow maximal data rates of 11 Mbps (802.11b), or 54 Mbps (for 20 MHz bandwidth and the 802.11g/802.11a standards). Using the emerging Multi-input Multi-Output technology the data rate of the emerging 802.11n standard can increase to above 200 Mbps when a 20 MHz band is used and double of that when a 40 MHz band is used. Another alternative is to use Ultra Wide Band (UWB), which claims to provide 100-400 Mbps.

Since the available data rate is lower than the 1.5 Gbps needed for uncompressed HDTV video, the video generally needs to be recompressed for wireless transmission, when desired. Known strong video compression methods, e.g. those having a compression factor of above 1:30 require very complex hardware to implement the compression. This is generally not practical for home applications. These compression methods generally transform the image into a different domain by using, for example, wavelet, discrete cosine transform (DCT), or Fourier transforms, and then perform the compression in that domain. The transforms typically decorrelate the data to allow for effective compression. In PCT application IL/2004/000779, Wireless Transmission of High Quality Video, assigned to common assignee and incorporated herein in its entirety by this reference thereto, there is shown a method of transmitting video images. The method includes providing high definition video, compressing the video using an image domain compression method, in which each pixel is coded based on a vicinity of the pixel, and transmitting the compressed video over a fading transmission channel.

In U.S. patent publication 2003/002582 to Obrador there is described a wireless transmission of images which are encoded using joint source channel coding (JSCC). The transmitted images are decomposed into a plurality of sub-bands of different frequencies. Image and corresponding boundary coefficients with a lowest resolution are sent first and then image and boundary coefficients with a higher resolution are transmitted. An exemplary JSCC applies channel encoding techniques to the source coded coefficients, providing more protection to more important, i.e. low frequency, coefficients and less protection to less important, i.e. high frequency, coefficients. Another technique for JSCC was proposed by Ramstad, *The Marriage of Subband Coding and OFDM Transmission*, Norwegian University of Science and Technology (July 2003), that combines subband coding of the source, for example images, and OFDM modulation.

In digital transmission methods, signals are transmitted in the form of symbols. Each symbol can have one of a predetermined number of possible values. The set of possible values of each symbol is referred to as a constellation and each possible value is referred to as a constellation point. The distance between neighboring points affects the immunity to noise. The noise causes reception of another point instead of the intended point, and thus the symbol may be interpreted incorrectly. In orthogonal frequency division multiplexing (OFDM) communication scheme, the symbols are comprised of multiple bins, e.g., 64, 128 or 256 bins, in the frequency domain, each bin of each symbol comprised of a two dimensional constellation. It is also known in the art that the use of some of the available bins is not recommended. Typically these are the bins located at the ends of the transmission band. Typically, for example in 802.11a/g, some 16 available channels out of the 64, are not used, and hence the efficiency of the band is reduced.

In U.S. patent application serial no, 2004/0196920 and 2004/0196404 by Loheit et al. another scheme is proposed for the transmission of HDTV over a wireless link. The discussed scheme transmits and receives an uncompressed HDTV signal over a wireless RF link which includes a clock that provides a clock signal synchronized to the uncompressed HDTV signal. This scheme also includes a data regeneration module connected to the clock, which provides a stream of regenerated data from the uncompressed HDTV signal. A demultiplexer demultiplexes the stream of regenerated data, using the clock signal, into an I data stream and a Q data stream. A modulator connected to the demultiplexer modulates a carrier with the I data stream and the Q data stream. According to Loheit et al. the RF links operate at a variety of frequency bands from 18 GHz up to 110 GHz, hence requiring sophisticated and more expensive transmitters and receivers.

In view of a variety of limitations of the prior art it would be advantageous to provide a solution that enables the reliable wireless transmission of an HDTV stream while avoiding the need for aggressive or complex compression, or complex hardware implementations. In particular it would be advantageous to avoid a compression that relies on having frame buffers for reaching the compression levels necessary to transmit the vast amount of data required in applications, such as wireless transmission of HDTV data streams. It would be further advantageous to avoid use of ultra-high frequencies to achieve the goal of wireless transmission of an HDTV data stream. It would be of further advantage if the proposed system would not insert delays in the transmission of the video. It would be further advantageous if a more efficient use of the transmission band is achieved, thus allowing the transmission of more information.

SUMMARY OF THE INVENTION

The invention enables the transmission of continuous complex numbers using a symbol based transmission scheme such as OFDM. Accordingly, complex numbers are mapped to the constellation map, enabling a fine granularity of constellation points. This scheme may be used, for example, in the transmission of video where the coefficients representing the higher frequency of each of the video components, as well as the quantization error values of the DC and near DC components, or some, possibly non-linear transformation thereof, are sent as pairs of real and imaginary portions of a complex number that comprises a symbol.

DETAILED DESCRIPTION OF A PREFERRED EMBODIMENT

The disclosed invention is intended to overcome the deficiencies of the prior art solutions by providing a scheme that allows the transmission of video, such as a high-definition television (HDTV) video, over a wireless link using transmission symbols, such as symbols of an OFDM scheme. Specifically, the inventors have realized that it is possible to map the coefficients of a block of pixels, or a portion thereof, after a de-correlating transformation directly into the transmission symbols. The de-correlation is performed for the purpose of minimizing the energy of the coefficients but without compromising the number of degrees of freedom available. For example, a discrete cosine transform (DCT) is performed on a block of pixels of each of the Y, Cr and Cb components of the video. The Y component provides the luminance of the pixel, while the Cr and Cb components provide the color difference information, otherwise known as chrominance. In a preferred embodiment all the coefficients are transmitted in accordance with the disclosed invention. In another embodiment of the disclosed invention, only a portion of the coefficients are used for transmission purposes, thereby avoiding the very high spatial frequency coefficients and keeping the lower spatial frequency coefficients. Significantly, more of the Y related coefficients are preserved for wireless transmission purposes than those for the other two components, as the human eye is more sensitive to luminance then chrominance. Without limitation and for the purposes of example only, a ratio of at least three coefficients respective of the Y component may be used for each of the Cr and Cb components, e.g. a ratio of 3:1:1. However, other ratios may be used without departing from the spirit of the disclosed invention. Hence, in accordance with the disclosed invention emphasis is given to DC and near DC coefficients over coefficients representing higher frequencies, and coefficients respective of luminance receive a preferred treatment over coefficients respective of chrominance. Unlike compression techniques of the likes of JPEG and MPEG, the invention further sends the information of the quantization error over the transmission channel thereby allowing the reconstruction of the video frame and providing an essentially uncompressed transmission of video, and in particular high-definition video, over a transmission channel, wired or wireless.

In accordance with the invention, the DC coefficients, or DC proximate coefficients having a larger value, are represented in a coarse, sometimes referred to as digital, manner, i.e. part of the DC value is represented as one of a plurality of constellation points of a symbol. This is achieved by performing a quantization on these values and mapping those quantized values in accordance with the disclosed invention. The higher frequency coefficients and in addition the quantization errors of the DC and the DC proximate components whose main part is presented coarsely, are grouped in pairs, positioning each pair in a point as the real and imaginary values of the complex number, that provide the fine granularity, almost analog, value which at an extreme fineness provides for a continuous representation of these values.

Optionally, a non-linear transformation, referred to as companding, is performed on any one of these values that comprise the complex number. Companding is a non-linear transformation of a value. Common companding functions are logarithmic, e.g., A-law and μ-law. The use of these techniques effectively provide for a better dynamical range and better signal-to-noise ratio in representing the corresponding values. In a preferred embodiment the following companding function may be used:

$$f(x) = \alpha * \text{sign}(x) * \sqrt{|x|} \quad (1)$$

where x is the value of the coefficient and α is a factor designed to maintain the power of f(x) to be the same as that of x.

Another possible mapping allows the mapping of a number of data values to a smaller number of values thereby potentially saving transmission bandwidth. For example, two numbers are mapped into one number, or three numbers are mapped into two numbers and the likes. While inserting a certain distortion when the original values are reconstructed, the advantage is the capability of sending also the less important data on the limited available bandwidth. In an exemplary two numbers, for example $x_1$ and $x_2$, would therefore be transformed by a function that would result in a single value $f(x_1,x_2)$, where $f(x_1,x_2)$ would be further multiplied by a factor $\alpha$, designed to maintain the power after the mapping to be the same as prior to the mapping, shown as:

$$\alpha^2 E(f^2(x_1,x_2))=E(x_1^2)+E(x_2^2) \qquad (2)$$

where $\alpha$ is the factor designed to maintain the power of $f(x_1,x_2)$ to be the same as the combined power of $x_1$ and $x_2$. In one embodiment of the disclosed invention the data transferred may be encrypted.

Unlike MPEG and the likes, the invention disclosed herein allows keeping all the coefficients of the de-correlating transform. Therefore the reconstruction at the receiver side is more accurate as more information is available for such reconstruction. Furthermore, in accordance with the disclosed invention it is possible to use sub-channels of the transmission channel, normally avoided so as to provide necessary margin or to avoid interference problems, for the purpose of transmitting those coefficient values which receive a lesser representation. By transmitting the less important values as determined in accordance with the disclosed invention, over the normally un-used sub-channels, or subbands, effectively there is an increase of the available bandwidth for transmission. In addition some values can be compacted together using the methods described hereinabove.

The constellation points of all the coarse and fine constellations, generated as disclosed above, are arranged as series of complex numbers that are modulated for the transmission purposes. In a preferred embodiment for wireless communication, but without limitation on the disclosed invention, orthogonal frequency division modulation (OFDM) is used. In OFDM communication scheme, symbols are comprised of multiple bins, in the frequency domain, each bin of each symbol comprised of a two dimensional constellation (a complex number). In a communication system having a bandwidth W there are 2W degrees of freedom. If the spectral efficiency $\rho$ is less than 100% then the number of degrees of freedom is $2W\rho$ per second. Since each complex number contains two degrees of freedom the number of complex number that can be transmitted is $\rho W$. By using multiple transmission antennas, that require multiple reception antennas, i.e., a multi-in multi-input multi-output (MIMO) system, the transmission rate for a given bandwidth is increased.

Following is a detailed description of the principles of the disclosed invention. While the invention is described with respect to particular embodiments and respective figures, such are not intended to limit the scope of the invention and are provided for purposes of example only.

Figure 1:
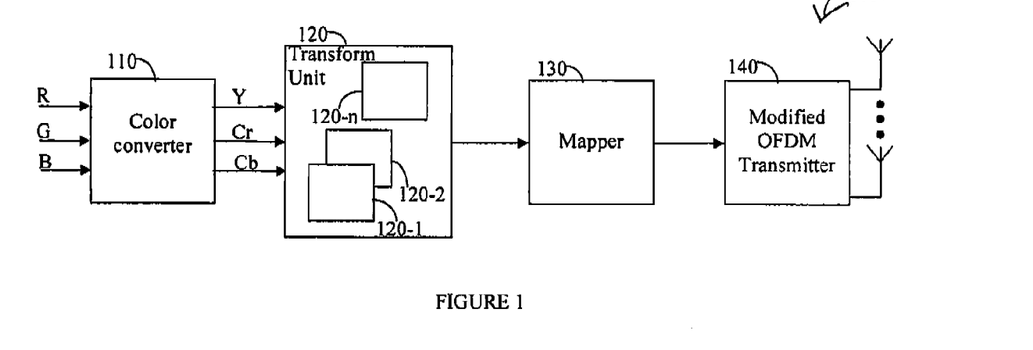
FIG. 1 is a block diagram of coding system in accordance with the disclosed invention.

FIG. 1 shows an exemplary and non-limiting block diagram of system 100 for direct symbol coding in accordance with the disclosed invention. The system 100 receives the red-green-blue (RGB) components of a video signal, for example an HDTV video signal. The RGB stream is converted in the color conversion block 110 to the luminance component Y, and the two color difference components, Cr and Cb. This conversion is well known to persons of ordinary skill in the art. In one embodiment of the disclosed invention, the video begins with a Y-Cr-Cb video signal and, in such a case, there is no need for the color conversion block 110. The Y-Cr-Cb components are fed to a transform unit 120 where a de-correlating transformation is performed on blocks of pixels respective of each of the three components. In one embodiment of the disclosed invention, the block 120 performs a DCT on the blocks of pixels. A block of pixels may contain 64 pixels arranged in an 8-by-8 format, as shown in to FIG. 2. The transform unit 120 may comprise a single subunit for performing the desired transform, for example a DCT, handling the conversions for all the blocks of pixels of an entire video frame for each of the Y-Cr-Cb component. In another embodiment, a dedicated transform subunit is used for each of the Y-Cr-Cb components, thereby accelerating the performance of the system. In yet another embodiment a plurality of subunits are used such that two or more such subunits, capable of performing a desired transform on a block of pixels, are used for each of the Y-Cr-Cb components, thus further accelerating the performance of the system 100. The output of transform unit 120 is a series of coefficients which are fed to a mapper 130. The mapper 130 selects those coefficients from each of the Y-Cr-Cb components which are to be transferred over the wireless link. The mapper 130 also maps the coefficients to be sent to transmission symbols, for example, the symbols of an orthogonal frequency division multiplexing (OFDM) scheme, a process described in more detail with respect to FIG. 4. The symbols are then transmitted using a modified OFDM transmitter 140 that handles the mixed nature of the symbols having a mix of coarse and fine constellation values, as explained in more detail with respect to FIG. 2. In one embodiment of the disclosed invention, a modified OFDM transmitter 140 is connected to a plurality of antennas for the purpose of supporting a multi-input, multi-output (MIMO) transmission scheme, thereby increasing the effective bandwidth and reliability of the transmission. A person skilled in the art further appreciate that a receiver, for example the receiver shown in FIG. 8, adapted to receive the wireless signal comprising the symbols transmitted in accordance with the disclosed invention, must be capable of detecting the coarse and fine representations of the sent symbols, reconstruct the respective coefficients, and perform an inverse transform to reconstructing the Y-Cr-Cb components. However, because there is no frame-to-frame compression there is no need for frame buffers in the system. Because the mapping and transform are fast and work on small blocks with no need to consider wide area correlation in the image, nor frame-to-frame correlations, there is practically no delay associated with the operations disclosed herein, and further more only a limited number of lines need to be kept within frame processing. The components the receiver are discussed in more detail below.

In accordance with the disclosed invention, a de-correlating transform, such as a DCT, is performed on blocks of pixels, for example 8-by-8 pixels, on each of the Y-Cr-Cb components of the video. As a result of the transform on a block, for example a block 210 shown in FIG. 2, a two dimensional coefficient matrix 220 is created. The coefficients closer to the origin, in the area 222, are generally the low frequency and DC portions of each of the Y-Cr-Cb components, such as the coefficient 222-i. Higher frequency coefficients may be found in the area 224, such as coefficients 224-i, 224-j, and 224-k, generally having a significantly smaller magnitude than the DC components, for example less than half the amplitude of the DC component. Even higher frequencies may be found in the area marked as 226. The inventors have noted that, to keep an essentially uncompressed video, it may be possible to remove the high frequency coefficients in the area 226 for each of the Y-Cr-Cb components. The area 226 may be smaller or larger depending on the number of coefficients that may be sent in a particular implementation. The main portion of the DC coefficient, for example the most significant bits of the coefficient 222-$i$, is preferably mapped into one of a plurality of constellation points, such as shown in the constellation map 230. A constellation map may be a 4QAM (QPSK), 16QAM, or any other appropriate type. Because four constellation points 231 through 234 are shown in constellation map 230, a 4QAM implementation is taught in this embodiment, and each of the constellation points is mapped to a digital value from 00 to 11, respectively. The quantized value of coefficient 222-$i$ is mapped to one such constellation point, depending on its specific value. Such a mapping is considered a digital value mapping.

Figure 2:
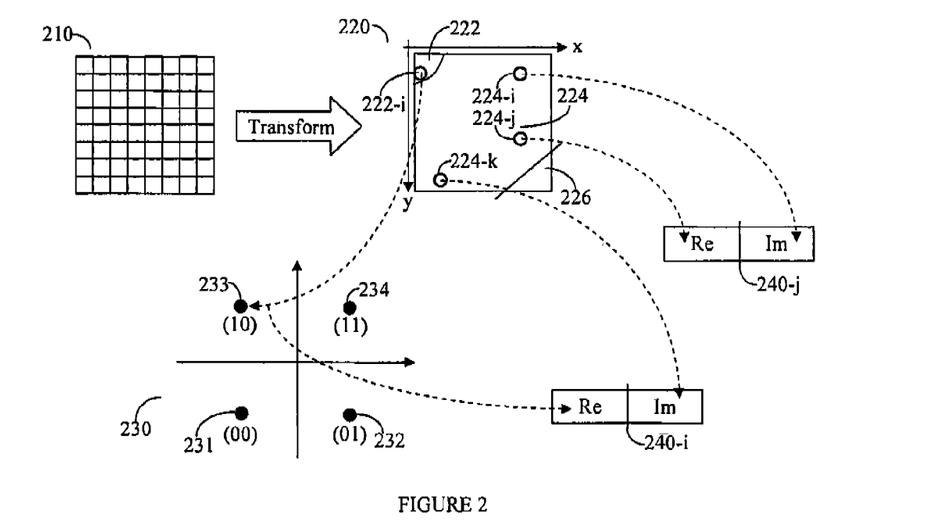
FIG. 2 is a schematic diagram showing an 8-by-8 pixel de-correlation transform, the grouping of the coefficients, and the mapping into coarse and fine symbol representations in accordance with the disclosed invention.

However, this coarse representation is also likely to have a quantization error, or in other words, a value corresponding to the difference between the original value and the value represented by the coarse representation. This error essentially corresponds to the least significant bits of the high importance coefficients' values that were quantized. The quantization error value, as well as coefficients not represented in a coarse manner, i.e., the coefficients associated with the higher frequencies of area 224, may be mapped as part of constellation point 240-$i$ as, for example, the real portion of the complex number constituting the symbol 240-$i$. The higher frequency coefficients are paired and each pair is mapped to a constellation point as a real portion and an imaginary portion of a complex number. For example, the coefficients 224-$i$ and 224-$j$ may be mapped to the imaginary and real portions of a constellation point 240-$j$. This allows for a continuous representation effectively using any available point in the constellation mapping, or otherwise providing a fine constellation. Such a mapping is considered continuous value mapping.

As noted above, a receiver enabled to receive the symbol stream disclosed herein, such as the receiver shown in FIG. 8, should be able to recompose the coefficients from the transmitted symbols, and is discussed in more detail below. The inventions of MIMO with continuous representation and OFDM with continuous representation provide advantages over the prior art. Specifically, only simple and straightforward algebraic computation is necessary for the reception of the fine values of the transmitted video stream. Even if some errors occur, the impact on the quality of the video stream is quite limited and generally non-observable. By contrast, MIMO and/or OFDM systems sending pure data, including video transmitted as data rather than that in the manner disclosed in this invention, requires significantly more compute power, and more bandwidth, generally not readily available, and the video quality is more sensitive to errors.

Figure 3:
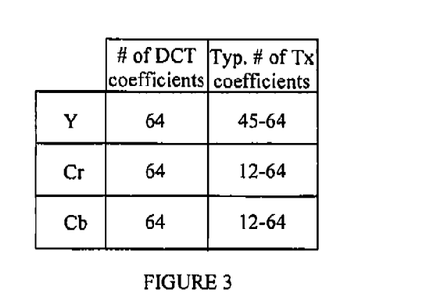
FIG. 3 is a table showing the number of coefficients selected from each of the transformed Y, Cr and Cb of an 8-by-8 pixel conversion in accordance with an embodiment described in the disclosed invention.

An exemplary reference may be found in FIG. 3, where an 8-by-8 coefficient matrix is assumed and, hence, there are 64 coefficients found for each of the Y-Cr-Cb components. However, for the reasons mentioned hereinabove, typically between 28-64 of the coefficients of the Y component, and 12-64 of each of the Cr and Cb components are transmitted over the wireless link. The exact number of coefficients may be determined based on the available number of OFDM symbols, where each bin of the OFDM symbol has two degrees of freedom, available for wireless transmission, and on the desired level of reliability of the wireless transmission. A 20 MHz OFDM channel allows for up to 20M complex numbers, 20M real and 20M imaginary, per second, i.e., 40M degrees of freedom per second. In a MIMO, that effectively expands the available bandwidth, system with four transmission antennas four such 20 MHz OFDM channels are made available and hence, theoretically, up to 160M numbers, or degrees of freedom per second, are possible. In practice full spectral efficiency is not achievable. Due to the techniques disclosed herein, spectral efficiency of the disclosed solution is typically ~75% and hence each transmission channel can deliver about 30M degrees of freedom per second or a total of 120M degrees of freedom per second, in the discussed example. In accordance with the disclosed invention some of the channels are used to transmit the coarse representation and the rest to transmit the fine representation. More degrees of freedom are provided to the more important coefficients while less degrees of freedom are provided to the less important coefficients, or even quantization errors thereof. In an exemplary transmission of an HDTV video a single frame is contained in about 1200 OFDM symbols corresponding to 256 bins, and which contain the information of about 14,400 blocks of 8-by-8 pixels. The use of a 40 MHz bandwidth channel will allow the sending of twice the number of coefficients and thus more of the coefficients more accurately, for example, it may allow sending the coarse information that has higher importance in a more robust manner, by repeating the information in the course of transmission.

Figure 4:
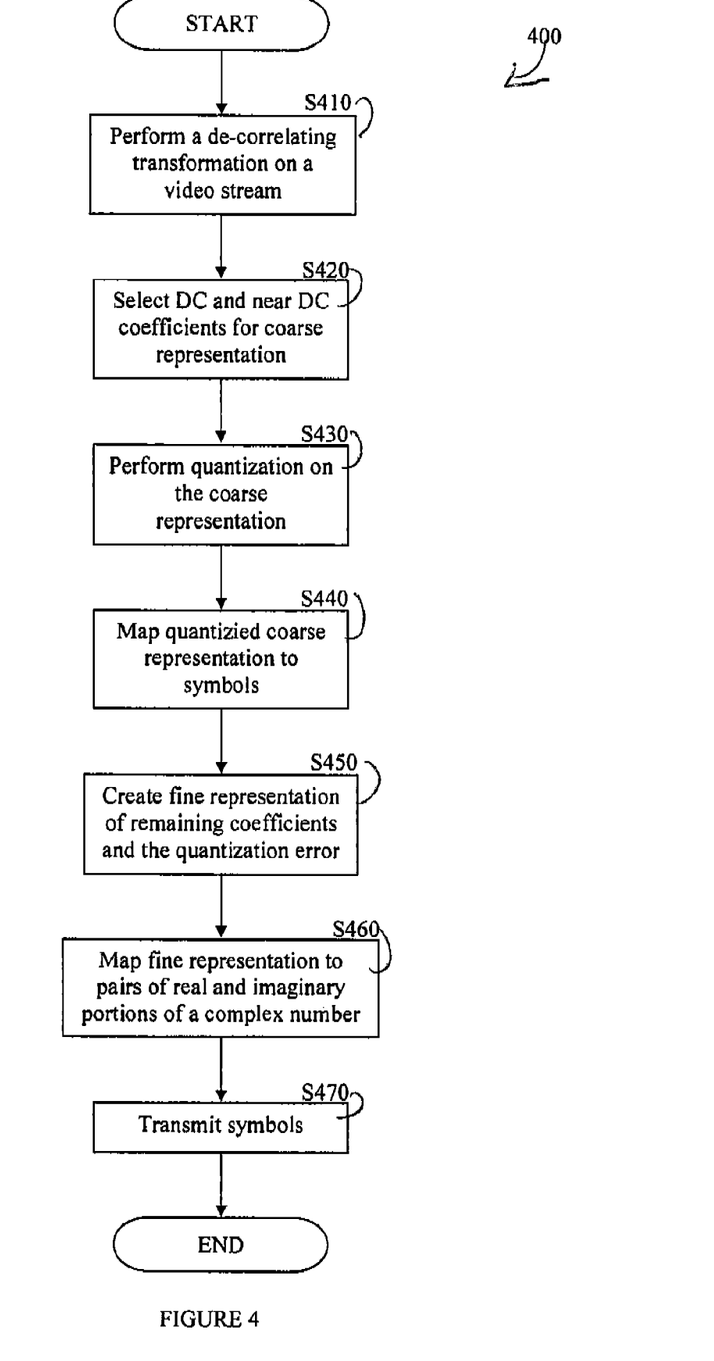
FIG. 4 is a flowchart describing the principles of the disclosed invention.

FIG. 4 shows an overview flowchart 400 describing the principles that are at the core of the disclosed invention. In S410 a video stream undergoes a de-correlating transformation. As a result a plurality of coefficients describing the components of the original video stream are provided. In S420 the DC and DC proximate coefficients are selected for the coarse representation of the transmission in accordance with the disclosed invention. In S430 a quantization of the coarse representation takes place and in S440 the quantized coarse representation is mapped onto symbols in accordance with the disclosed invention. In S450 the fine representation comprised of quantization error values from the quantization in S430 as well as the remaining coefficients not selected in S420 form the fine representation of the transmission in accordance with the disclosed invention are prepared. In one embodiment of the disclosed invention only a portion of the higher frequency coefficients are selected for use with respect of the fine representation stream. In yet another embodiment of the disclosed invention the fine representation data, or portions thereof, undergoes non-linear transformations, as explained in more detail above. In S460 the fine representation values are mapped into pairs of real and imaginary portions of symbols. Lastly, in S470 the created symbols are transmitted in accordance with the disclosed invention.

Figure 5:
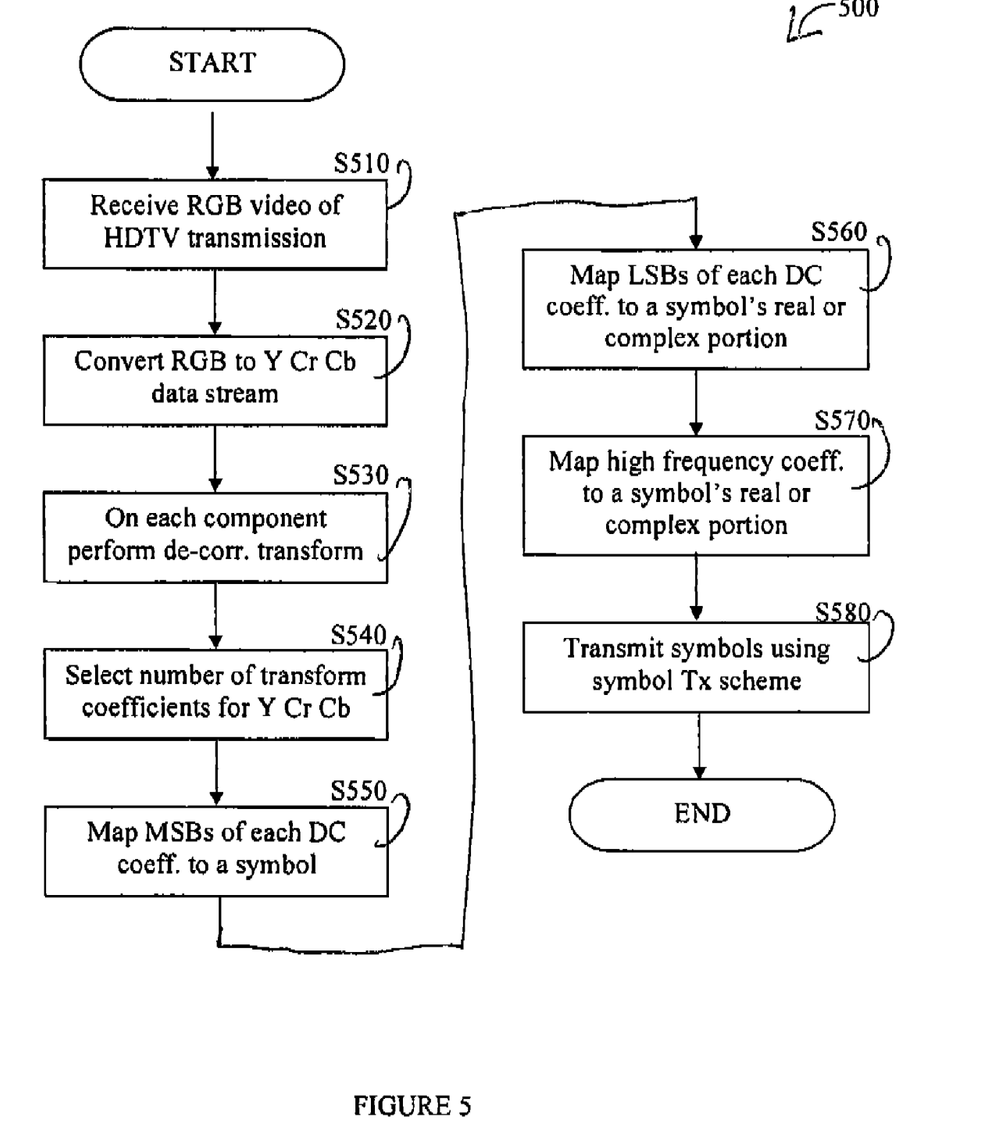
FIG. 5 is a flowchart showing handling an HDTV video for wireless transmission using OFDM scheme in accordance with the disclosed invention.

FIG. 5 shows an exemplary and non-limiting flowchart 500 of the handling of an HDTV video for wireless transmission using the OFDM scheme in accordance with the disclosed invention. In S510, a RGB video is received. In S520, the RGB is converted to a Y-Cr-Cb video data stream. In one embodiment of the disclosed invention, a Y-Cr-Cb video is provided and, therefore, the conversions discussed with respect to S510 and S520 are not necessary. In S530 a de-correlating transform is performed, for example DCT, on each of the plurality of blocks of pixels, for example a block of 8-by-8 pixels, of each of the Y-Cr-Cb components of the video. A plurality of coefficients is created as a result for each block, for example 64 coefficients in the case of the 8-by-8 block. Optionally, in S540, for each of the Y-Cr-Cb components, the number of coefficients to be transmitted is selected. A person skilled in the art would appreciate that in a sense a compaction takes place in this case. However, the compaction, if performed, takes place on low coefficient values.

S550 through S570 provide a more detailed description of the mapping process discussed with respect to FIGS. 1, 2 and 4 above. In S550, the coefficients in the DC and DC proximate range are handled. Typically, their amplitude is significantly higher than that of the rest of the coefficients, i.e., their most significant bits (MSBs) are material for the information to be sent, and hence these form the coarse representation. Therefore, the MSBs of these coefficients are mapped separately and differently from their respective least significant bits (LSBs), which are otherwise referred to as the quantization error of the DC coefficient. For example, if the coefficient is represented by 11-bits, the three MSBs are separated from the rest of the bits as a coarse representation, and transferred as a symbol of its own. In one embodiment, the coarse representation is repeated in several symbols for the purpose of ensuring proper and robust reception because the loss of this information is significant for the quality of the reconstructed image. Specifically, the coarse representation is sent as explained in more detail with respect to FIG. 2 above. In another embodiment error correction code is used to assure the robust reception of these bits. The error correction may further be an unequal error correction which is described in detail in U.S. provisional patent application Ser. No. 60/752,155, entitled "An Apparatus and Method for Unequal Error Protection of Wireless Video Transmission", assigned to common assignee and which is hereby incorporated by reference for all the useful information it may contain. In a further embodiment the more important coefficients are represented by more of the MSBs versus other coefficients represented by fewer MSBs. The LSBs of the DC component that (as noted above) have an amplitude described by the LSBs, for example 8 LSBs of an 11-bit value, as well as the rest of the higher frequency coefficients, construct the fine representation of the coefficients and may be mapped as explained with respect of S560 and S570, as further discussed with reference to FIG. 2 above. Each pair of the fine representation values may be viewed as the real and imaginary components of a complex value which establishes a symbol of the OFDM scheme. Therefore, if there are 230 available symbols for transmission in a given time slot, it is possible to send up to 460 pairs of real and imaginary portions of a complex values. However, some 60 symbols are used to send coarse values as explained above. In S580, the symbols are transmitted over a wireless link using the OFDM scheme. The overall result of using the steps described herein is to provide a very high frame rate, for example above 45 frames per second, or over 0.6 Gbits per second of video information, hence allowing for a high quality transmission of HDTV video where the video is essentially uncompressed.

The separation to a quantized value referred to as a coarse representation and a quantization error referred to as a fine representation, for describing the DC and other important transform coefficients, can be generalized as follows. These coefficients can pass via a quantizer that can take several values, say $M=2^n$. The specification of the quantizer value, represented by n bits plays the role of the MSB's, or coarse values, above, while the quantization error, or fine representation, that is the original value minus the value represented by the quantizer, plays the role of the LSB's above.

One embodiment of the disclosed invention makes use of pilots. Commonly, pilots are sent as a priori known signals in some bins of the OFDM symbol, preferably a value from a QPSK constellation. These pilots, alone or in conjunction with other pilots, are used in standard modems for synchronization, frequency, phase corrections, and the like. Pilots can also help in channel estimation and equalization. In standard digital modem, these pilots together with the digital information values, the latter being used via decision feedback because these values are known to those skilled in the art after decoding, allow robust channel estimation and tracking. In the invention disclosed herein, the analog data, sent in the manner discussed in more detail above, makes the use of decision feedback impossible. Therefore, in accordance with this embodiment of the disclosed invention additional pilots are sent to ensure stable channel estimation and tracking. These pilots may now be used for the purpose of sending the digital data discussed in more detail above, i.e. the coarse values of some transform coefficients are sent over these pilots. Because additional pilot signals are sent, there is more room for coarsely represented data. This results in an improved signal-to-noise ratio (SNR) on the finely represented data, because even larger portion of the transform coefficients, for example the DCT coefficient, is now sent. Alternatively the higher importance coefficients can now be sent more than once thereby increasing the noise immunity for such high importance coefficients.

Figure 6:
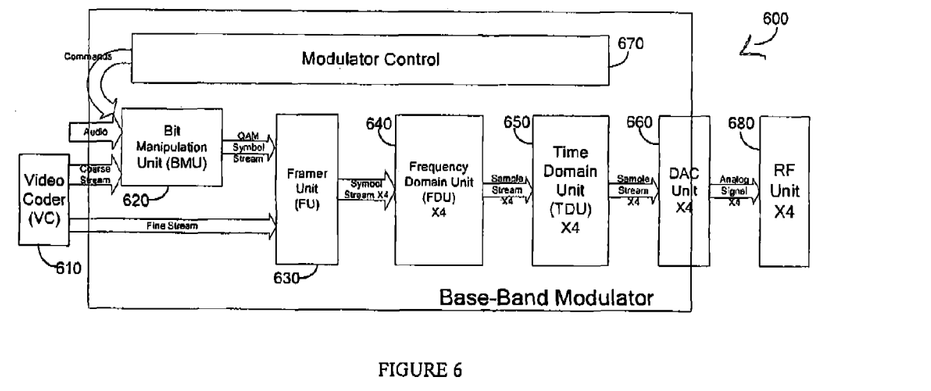
FIG. 6 is a detailed block diagram of a coding system in accordance with the disclosed invention.

FIG. 6 shows an exemplary and non-limiting block diagram 600 of a system designed to handle the coding in accordance with the disclosed invention. A base band modulator is divided into five basic blocks, according to the functionality and working domain of each bock. The modulator input consists of four signals: one is a symbol stream of the fine data, the result of the transform discussed in more detail above with respect to the handling of the quantization error values of the higher importance coefficients and those coefficients identified to be of lower importance. The other is a bit stream that represents the coarse part of the DC values of, for example, Y, Cr and Cb components, and possibly the coarse part of some other components as explained in more detail above with respect of the MSBs of the coefficients above. These streams are supplied from video coder 610. In addition, there may be an audio signal, and command signals that come from modem control 670. The signals from modem control 670 consists of a number of control commands that are to be passed to the receiver, for example the receiver of FIG. 8, as well as other control signals to control the modulator. In one embodiment of the system 600, the modulator output consists of a plurality of signals, for example four signals, that carry the information to digital-to-analog converter 660. This allows for the implementation of MIMO transmission as discussed above.

Figure 7:
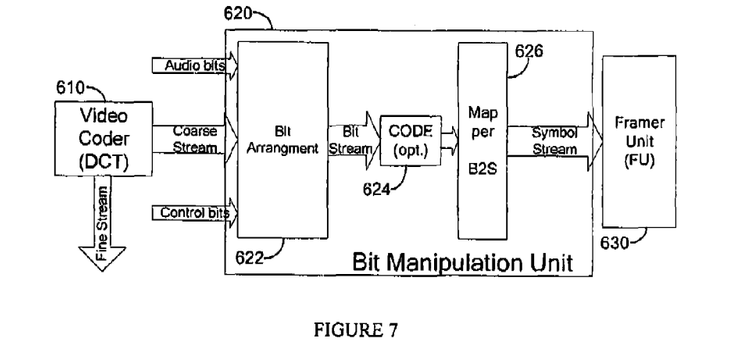
FIG. 7 is a block diagram of the bit manipulation block of a coding system in accordance with the disclosed invention.

FIG. 7 shows an exemplary and non-limiting block diagram of bit manipulation unit (BMU) 620 of the system 600. The BMU 620 is capable of performing all bit manipulations on the data bits themselves. There are no quantization errors handled by the BMU 620, and all operations are performed bitwise. First, the audio and coarse representation bit streams are arranged in a predefined order and create a single bit stream by the bit arrangement unit 622. After optional coding by optional coding unit 624, the bits of the single bit stream are mapped to the desired constellation by B2S mapper 626 and passed to a framer unit 630. The framer unit 630 receives the single bit stream and the fine bit stream as a number of sample streams and organizes it into four sample streams with an appropriate header, pilots, and so on. Two different data streams are padded with pilots and, optionally, with some other data where it may be deemed necessary, and then interleaved. In a MIMO implementation, the stream is divided into a plurality of streams, for example four streams, one for each of the MIMO transmitters. The frequency domain unit (FDU) 640 gets its inputs from the framer 530. The framer 630 creates a symbol stream, such that each symbol is a complex number in accordance with the disclosed invention, as described hereinabove, that represents a point in the two-dimensional space. The framer 630 also includes an inverse fast Fourier transform (IFFT) operation, and the resultant signal is fed to the time domain unit (TDU) 650 where certain shaping of the signal is performed prior to converting the signal to an analog signal in the digital-to-analog converter (DAC) 660.

The DAC 660 may be operative, in one embodiment of the disclosed invention, at a sampling rate of 40 MHz, or even higher frequencies, for example 80 or 160 MHz. The desirable number of bits can be approximated using the following assumptions: quantization noise of about 6 dB per bit, peak to average (PAR) of the signal ~14 dB, symbol SNR for a desired bit error rate (BER) and given constellation ~22 dB, and a safety margin ~6 dB. In total, at least seven bits are required, however, to be on the safe side, and according to the limitations of existing technology, it is recommended to use, without limiting the generality of the disclosed invention, a 10-bit or even 12-bit DAC.

Figure 8:
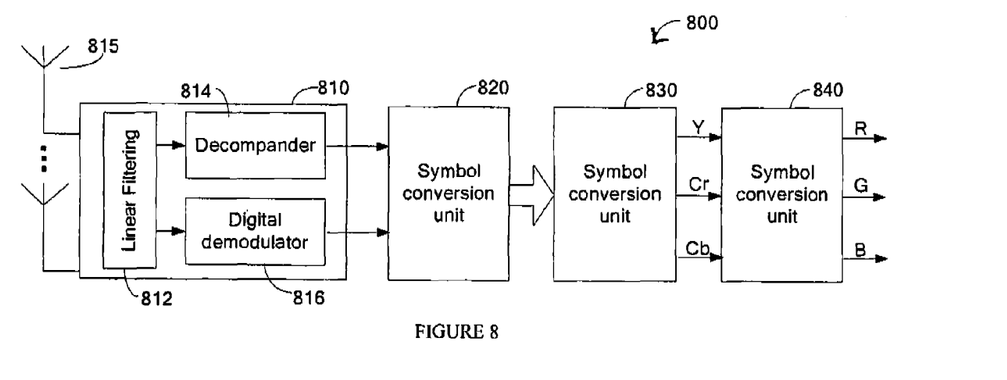
FIG. 8 is a block diagram of a receiver enabled to receive a video steam transmitted in accordance with the disclosed invention.

FIG. 8 shows an exemplary and non-limiting receiver 800 adapted to receive signals transmitted in accordance with the disclosed invention. A demodulator 810 is adapted to receive the symbols transmitted in accordance with the disclosed invention, for example as OFDM symbols. The reception is performed, for example, by means of receiving a wireless transmission received from a plurality of antennas 815. Typically, in a MIMO system, the receiver will have at least one more antenna over the number of channels, or antennas, used by the transmitter. The demodulator 810 receives the signals from antennas 815 and processed according to principles of linear filtering theory by unit 812, that also separates the received streams into the respective coarse and fine streams. Alternatively, the coarse data is decoded directly by a MIMO decoding method, such as sphere decoding, while the fine data is process in accordance with linear filtering theory. The fine stream is handled by the decompanding unit 814 that linearizes the received data and generates the fine stream data. The coarse stream is handled by digital demodulator 816 operative in accordance with standard digital modulation techniques and that generates the coarse stream data. The demodulator provides coarse and fine streams of detected OFDM symbols which are then converted by unit 820 to the coefficients by appropriately reconstructing them. Specifically, the information of the quantization errors is added to the respective coarse values to reconstruct the DC and near DC coefficients. Other fine values construct the high frequency coefficient. The reconstructed coefficients are now provided to the inverse transformation unit 830 that generates the Y, Cr, and Cb components of the video transmission. A color converter unit 840 further converts the luminance and chrominance inputs into a standard RGB output, if so desired. For purposes of simplicity, elements such as, but not limited to, decision feedback equalization, used to overcome channel distortions and enable precise reception, channel tracking, timing and carrier tracking, and other components, are not shown, however, such are part of any operable OFDM receiver, are well-known in the art, and hence considered part of the receiver. The receiver 800 may be further enabled to receive pilot signals and interpret them as containing data. Such a capability is described in detail in U.S. provisional patent application Ser. No. 60/758,060, entitled "Use of Pilot Symbols for Data Transmission in Uncompressed, Wireless Transmission of Video", assigned to common assignee and which is hereby incorporated by reference for all the useful information it may contain.

Although the invention is described herein with reference to several embodiments, including the preferred embodiment, one skilled in the art will readily appreciate that other applications may be substituted for those set forth herein without departing from the spirit and scope of the invention, including, but not limited to, transmission in accordance with the disclosed invention over a wired medium. The invention may be further implemented in hardware, software, firmware or any combination thereof. Accordingly, the invention should only be limited by the following claims. An embodiment may include a computer software product containing a plurality of instructions that when executed comprise the inventions disclosed herein.

The invention claimed is:

1. An apparatus comprising:
  a mapper to map a component of at least one data value to at least one fine constellation orthogonal-frequency-division-modulation symbol of a predefined fine transmission constellation;
  wherein said mapper is adapted to map a first component of said data value to at least one coarse constellation orthogonal-frequency-division-modulation symbol of a predefined coarse transmission constellation, and a second component of said data value to said fine constellation symbol; and
  wherein said fine constellation symbol comprises a complex number, and wherein said mapper is adapted to map said second component to one of real and imaginary portions of said complex number and to map a component of another data value to another of said real and imaginary portions.

2. The apparatus of claim 1, wherein said first component comprises a quantized value of said data value, and wherein said second component comprises a quantization-error value corresponding to said quantized value.

3. The apparatus of claim 1, wherein the component of the other data value comprises a quantization error value corresponding to the other data value.

4. The apparatus of claim 3, wherein said mapper is to map a quantized value of the other data value to another coarse constellation symbol of said coarse transmission constellation.

5. The apparatus of claim 1, wherein said mapper is to map a first other data value to one of real and imaginary portions of another fine constellation symbol of said fine transmission constellation, and to map a second other data value to another of said real and imaginary portions.

6. The apparatus of claim 1, wherein said at least one coarse constellation symbol comprises a plurality of coarse constellation symbols representing said first component.

7. The apparatus of claim 1, wherein said coarse transmission constellation comprises a quadrature-amplitude-modulation constellation.

8. The apparatus of claim 1 comprising a wireless transmitter to transmit a wireless transmission including said fine constellation symbol.

9. The apparatus of claim 1, wherein said data value corresponds to a video signal.

10. The apparatus of claim 9 comprising a transformation module generate a plurality of transformation coefficients corresponding to said video signal, and wherein said data value comprises a transformation coefficient of said plurality of transformation coefficients.

11. The apparatus of claim 10, wherein said plurality of transformation coefficients comprise a first plurality of transformation coefficients corresponding to a luminance component of said video signal, a second plurality of transformation coefficients corresponding to a first chrominance component of said video signal, and a third plurality of transformation coefficients corresponding to second chrominance component of said video signal; and
  wherein a number of the transformation coefficients corresponding to said luminance component is larger than at least one of a number of the transformation coefficients corresponding to said first chrominance component and a number of the transformation coefficients corresponding to said second chrominance component.

12. The apparatus of claim 9, wherein said video signal comprises a high-definition-television video signal.

13. The apparatus of claim 12, wherein said high-definition-television video signal has a rate of at least 45 frames per second.

14. The apparatus of claim 12, wherein said high-definition-television video signal comprises an uncompressed high definition video signal having a data rate of more than 100 Megabit per second.

15. A wireless transmission system comprising:
a transmitter to generate a wireless orthogonal-frequency-division-modulation transmission representing a plurality of data values corresponding to an input signal, said transmitter comprising a mapper to map a component of at least one data value of said data values to at least one fine constellation orthogonal-frequency-division-modulation symbol of a predefined fine transmission constellation; and
a receiver to receive said wireless transmission and generate an output signal corresponding to said input signal;
wherein said mapper is adapted to map a first component of said data value to at least one coarse constellation orthogonal-frequency-division-modulation symbol of a predefined coarse transmission constellation, and a second component of said data value to said fine constellation symbol; and
wherein said fine constellation symbol comprises a complex number, and wherein said mapper is to map said second component to one of real and imaginary portions of said complex number and to map a component of another data value to another of said real and imaginary portions.

16. The system of claim 15, wherein said first component comprises a quantized value of said data value, and wherein said second component comprises a quantization-error value corresponding to said quantized value.

17. The system of claim 15, wherein said at least one coarse constellation symbol comprises a plurality of coarse constellation symbols representing said first component.

18. The system of claim 15, wherein said coarse transmission constellation comprises a quadrature-amplitude-modulation constellation.

19. The system of claim 15, wherein said input signal comprises a video signal.

20. The system of claim 19, wherein said video signal comprises a high-definition-television video signal.

21. The system of claim 20, wherein said high-definition-television video signal has a rate of at least 45 frames per second.

22. The system of claim 20, wherein said high-definition-television video signal comprises an uncompressed high definition video signal having a data rate of more than 100 Megabit per second.

23. A method comprising:
mapping a component of at least one data value to at least one fine constellation orthogonal-frequency-division-modulation symbol of a predefined fine transmission constellation;
transmitting said signal;
wherein said mapping comprises mapping a first component of said data value to at least one coarse constellation orthogonal-frequency-division-modulation symbol of a predefined wireless coarse transmission constellation, and a second component of said data value to said fine constellation symbol; and wherein said fine constellation symbol comprises a complex number, the method comprising:
mapping said second component to one of real and imaginary portions of said complex number; and
mapping a component of another data value to another of said real and imaginary portions.

24. The method of claim 23, wherein said first component comprises a quantized value of said data value, and wherein said second component comprises a quantization-error value corresponding to said quantized value.

25. The method of claim 23, wherein the component of the other data value comprises a quantization error value corresponding to the other data value.

26. The method of claim 25 comprising mapping a quantized value of the other data value to another coarse constellation symbol of said coarse transmission constellation.

27. The method of claim 23 comprising: mapping a first other data value to one of real and imaginary portions of another fine constellation symbol of said fine transmission constellation; and mapping a second other data value to another of said real and imaginary portions.

28. The method of claim 23, wherein said at least one coarse constellation symbol comprises a plurality of coarse constellation symbols representing said first component.

29. The method of claim 23, wherein said coarse transmission constellation comprises a quadrature-amplitude-modulation constellation.

30. The method of claim 23 comprising transmitting a wireless transmission including said fine constellation symbol.

31. The method of claim 30 comprising: receiving said wireless transmission; and demapping said fine constellation symbol to determine said data value.

32. The method of claim 23, wherein said data value corresponds to a video signal.

33. The method of claim 32, wherein said video signal comprises a high-definition-television video signal.

* * * * *